(12) United States Patent
Park et al.

(10) Patent No.: US 12,502,919 B2
(45) Date of Patent: Dec. 23, 2025

(54) TRANSVERSE LEAF SPRING ASSEMBLY FOR SUSPENSION OF VEHICLE

(71) Applicant: HYUNDAI MOBIS CO., LTD., Seoul (KR)

(72) Inventors: Jong Mook Park, Yongin-si (KR); Ho Youn Hwang, Yongin-si (KR); Hyun Jin Woo, Yongin-si (KR); Hye Chan Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/799,512

(22) Filed: Aug. 9, 2024

(65) Prior Publication Data

US 2025/0162367 A1     May 22, 2025

(51) Int. Cl.
    *B60G 11/12*     (2006.01)
    *B60G 3/06*     (2006.01)
    *B60G 11/08*     (2006.01)

(52) U.S. Cl.
CPC ............... *B60G 11/12* (2013.01); *B60G 3/06* (2013.01); *B60G 11/08* (2013.01); *B60G 2200/142* (2013.01); *B60G 2202/114* (2013.01); *B60G 2204/121* (2013.01); *B60G 2204/40* (2013.01); *B60G 2206/428* (2013.01); *B60G 2206/7101* (2013.01); *B60G 2800/162* (2013.01)

(58) Field of Classification Search
CPC .......... B60G 11/12; B60G 3/06; B60G 11/08; B60G 2200/142; B60G 2202/114; B60G 2204/121; B60G 2204/40; B60G 2206/428; B60G 2206/7101; B60G 2800/162

USPC .................................... 280/214.171, 124.171
See application file for complete search history.

(56) References Cited

U.S. PATENT DOCUMENTS

| 6,029,987 | A * | 2/2000 | Hoffman | B60G 11/10 |
| | | | | 267/260 |
| 11,267,303 | B2 * | 3/2022 | Senoo | B60G 3/20 |
| 12,246,566 | B2 * | 3/2025 | Song | F16F 1/30 |
| 2014/0327196 | A1 * | 11/2014 | Hummelt | B60G 11/08 |
| | | | | 267/52 |

FOREIGN PATENT DOCUMENTS

| DE | 102009028896 A1 * | 3/2011 | ............. B60G 11/08 |
| DE | 202013103900 U1 * | 11/2013 | ............. B60G 11/08 |
| KR | 10-2021-0147535 A | 12/2021 | |

OTHER PUBLICATIONS

Fruhmann English translation and Original document for DE102009028896 (Year: 2009).*
Ford English translation and Original document for DE202013103900 (Year: 2020).*

* cited by examiner

*Primary Examiner* — Paul N Dickson
*Assistant Examiner* — Caitlin Anne Miller
(74) *Attorney, Agent, or Firm* — Morgan, Lewis & Bockius LLP (57) ABSTRACT

A transverse leaf spring assembly for a suspension of a vehicle according to the present disclosure includes: a frame; lower arms rotatably mounted on two sides of the frame, respectively; a bush mounted on the frame; and a leaf spring, which has two ends of the leaf spring in contact with the lower arms, respectively, includes a projection protruding from the leaf spring, and being fixed by the bush.

11 Claims, 6 Drawing Sheets

TRANSVERSE LEAF SPRING ASSEMBLY FOR SUSPENSION OF VEHICLE

CROSS-REFERENCE TO RELATED APPLICATION

The present application claims priority to and the benefit of Korean Patent Application No. 10-2023-0160928, filed on Nov. 20, 2023 in the Korean Intellectual Property Office, the entire disclosure of which is incorporated herein by reference.

BACKGROUND

Field

Exemplary embodiments of the present disclosure relate to a transverse leaf spring assembly for a suspension of a vehicle, and more particularly, to a transverse leaf spring assembly for a suspension of a vehicle, which may enable a center of a vehicle in a width direction of the vehicle and a center of a transverse leaf spring to align when the transverse leaf spring in the vehicle suspension is assembled.

Description of the Related Art

To secure battery space and interior space in an electric vehicle, a platform needs to be lowered. To this end, a suspension of the electric vehicle adopts a transverse leaf spring structure arranged in a transverse direction of the vehicle.

In addition, application of a composite material such as glass fiber reinforced plastic (GFRP) to reduce the weight of the vehicle requires a different assembly structure from that of a conventional metal leaf spring.

When a transverse leaf spring made of a composite material is assembled onto a suspension frame, the transverse leaf spring needs to be positioned to align with the transverse center of the vehicle.

In particular, when being assembled onto the suspension including a lower arm on one side thereof, the leaf spring is pushed away due to the rigidity and curvature of the leaf spring, thereby making it difficult for the leaf spring to be assembled onto the suspension including a lower arm on the other side thereof. Thus, there is a need for improvement to address this issue.

SUMMARY

Various embodiments are directed to a transverse leaf spring assembly for a suspension of a vehicle, which may enable a center of a vehicle in a width direction of the vehicle and a center of a transverse leaf spring to align when the transverse leaf spring in the vehicle suspension is assembled.

In an embodiment, a transverse leaf spring assembly for a suspension of a vehicle may include: a frame; lower arms rotatably mounted on two sides of the frame, respectively; a bush mounted on the frame; and a leaf spring, which has two ends in contact with the lower arms, respectively, includes a projection protruding from the leaf spring, and is fixed by the bush.

In the present disclosure, the bush may include: a first bush mounted on the frame and configured to be in contact with an upper surface of the leaf spring; and a second bush arranged beneath the first bush and configured to be in contact with a lower surface of the leaf spring. The projection may be inserted into at least one of the first bush and the second bush.

In the present disclosure, the first bush may include: a first bush body configured to be in contact with the upper surface of the leaf spring; a first bush protrusion protruding from the first bush body to surround a lateral surface of the leaf spring; and a first bush accommodation groove concavely disposed on the first bush body and configured to accommodate the projection protruding from the upper portion of the leaf spring.

In the present disclosure, the first bush may further include a first bush insertion portion protruding from the first bush body and inserted into the frame.

In the present disclosure, the second bush may include: a second bush body configured to be in contact with the lower surface of the leaf spring; a second bush protrusion protruding from the second bush body to surround the lateral surface of the leaf spring; and a second bush accommodation groove concavely formed on the second bush body and configured to accommodate the projection protruding from the lower portion of the leaf spring.

In the present disclosure, the second bush may further include a second bush insertion portion protruding from the second bush body and inserted into the frame.

In the present disclosure, the leaf spring may include a leaf spring body having the projection protruding from a surface thereof. The projection may include: a first projection protruding from the upper portion of the leaf spring body and inserted into the first bush; and a second projection protruding from the lower portion of the leaf spring body and inserted into the second bush.

The projection may be a hemispherical shape.

In the present disclosure, the frame may include: a frame body accommodating the bush and rotatably supporting the lower arm; a bracket closing the frame body, which accommodates the bush; and a fastener fastening the bracket to the frame body.

In the present disclosure, the frame body may include: a frame support body portion; a frame accommodation portion concavely formed on the frame support body portion and configured to accommodate the bush; and a frame rotation portion rotatably supporting the lower arm on the frame support body portion.

The leaf spring of the present disclosure may be made of glass fiber reinforced plastic (GFRP).

The transverse leaf spring assembly according to the present disclosure may enable the center of the vehicle in the width direction of the vehicle and the center of the transverse leaf spring to align when the transverse leaf spring is assembled.

In addition, the transverse leaf spring assembly according to the present disclosure may prevent the leaf spring from being pushed to an opposite side by the curvature and rigidity of the transverse leaf spring during assembly and ensure reliable ease of assembly as the projection of the leaf spring is inserted into the bush.

DETAILED DESCRIPTION

Hereinafter, a transverse leaf spring assembly for a suspension of a vehicle will be described below with reference to the accompanying drawings through various exemplary embodiments. It should be considered that the thickness of each line or the size of each component in the drawings may be exaggeratedly illustrated for clarity and convenience of description.

In addition, the terms as used herein are defined in consideration of functions of the present disclosure, and these terms may change depending on a user or operator's intention or practice. Therefore, definitions of these terms will have to be made based on the content herein.

Figure 1:
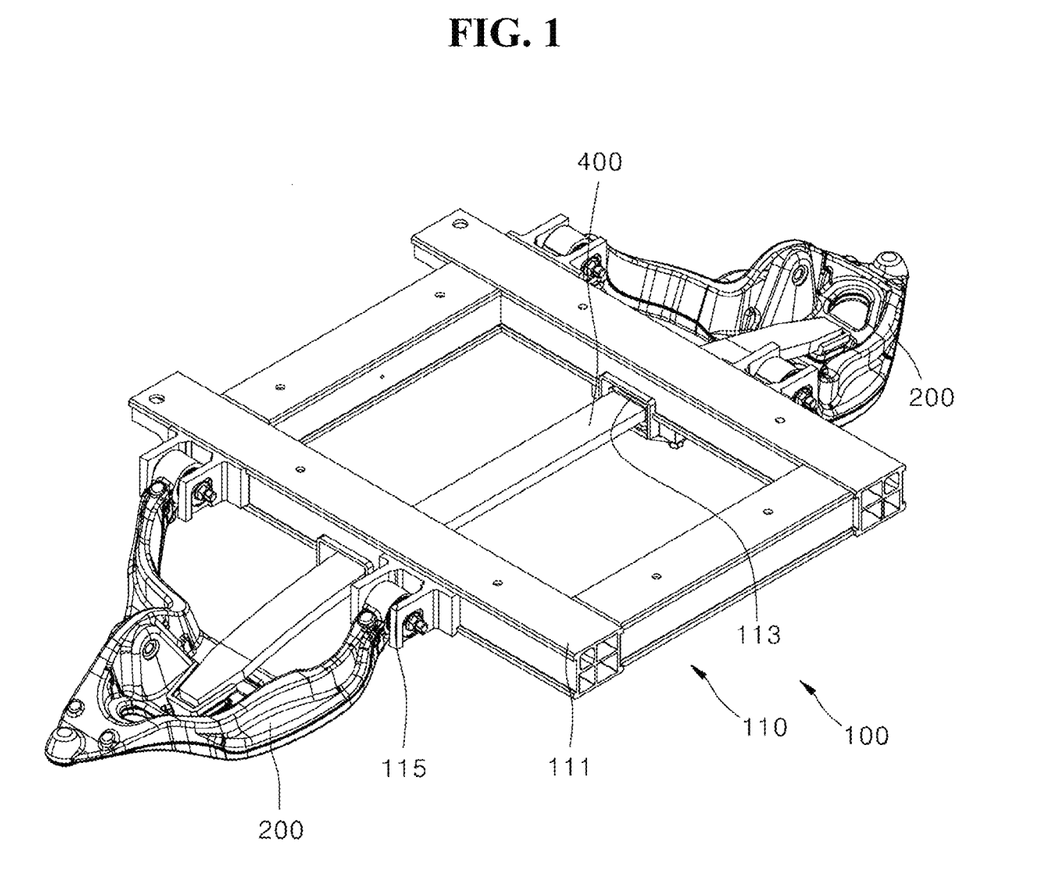
FIG. 1 is a perspective view schematically illustrating a transverse leaf spring assembly for a suspension of a vehicle according to an embodiment of the present disclosure.
Figure 2:
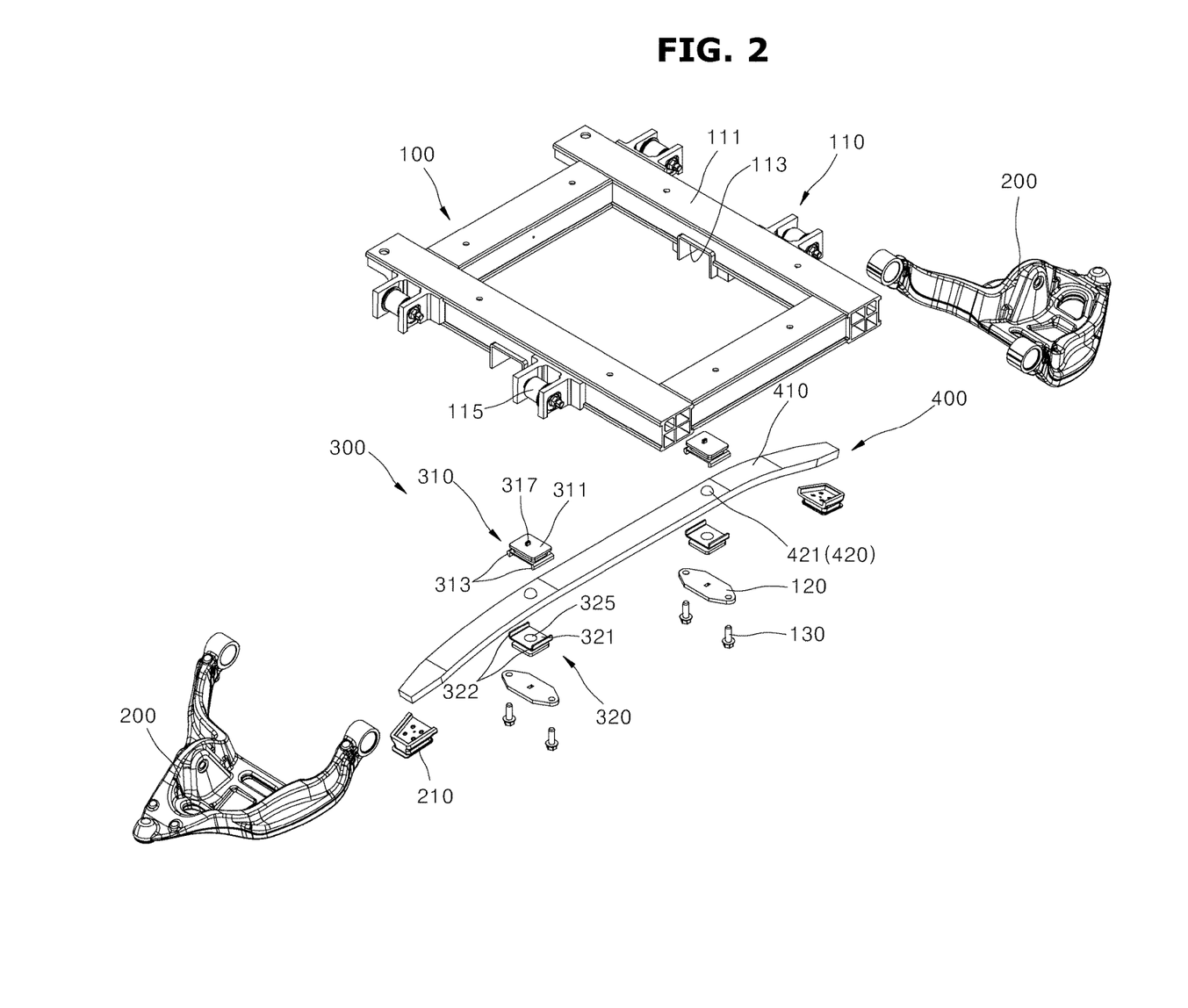
FIG. 2 is an assembled perspective view schematically illustrating the transverse leaf spring assembly according to an embodiment of the present disclosure.
Figure 3:
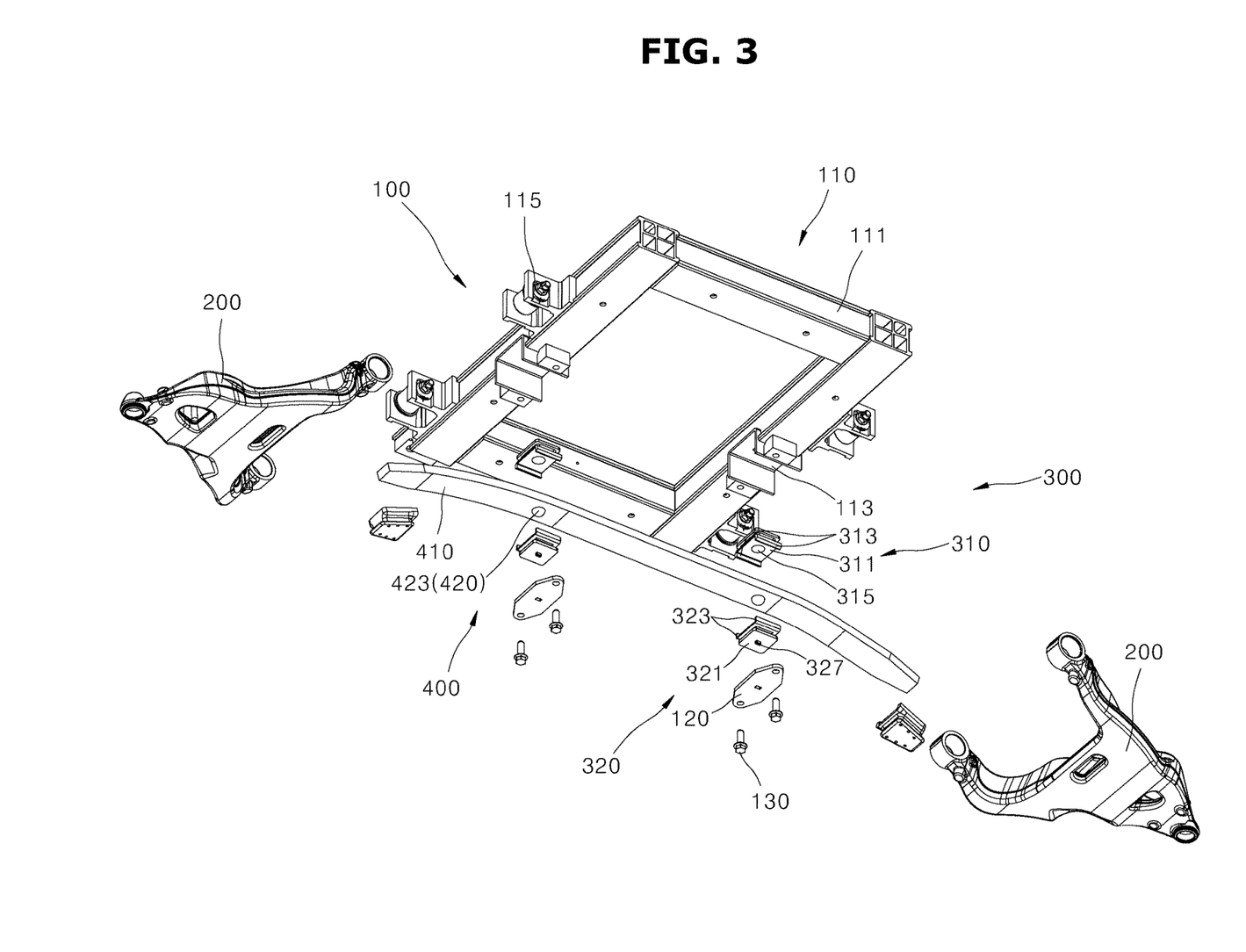
FIG. 3 is an assembled bottom perspective view schematically illustrating the transverse leaf spring assembly according to an embodiment of the present disclosure.
Figure 4:
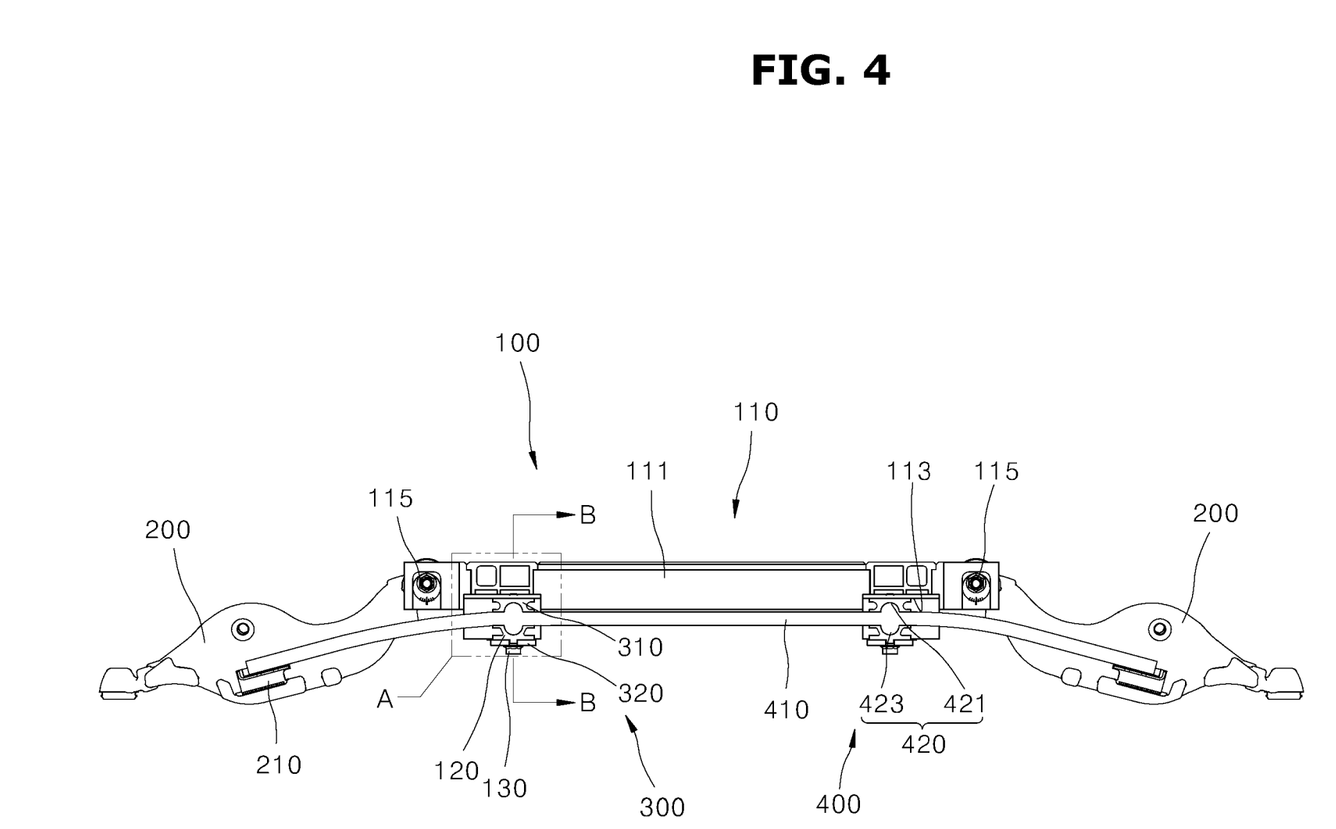
FIG. 4 is a front view schematically illustrating a transverse leaf spring assembly according to an embodiment of the present disclosure.
Figure 5:
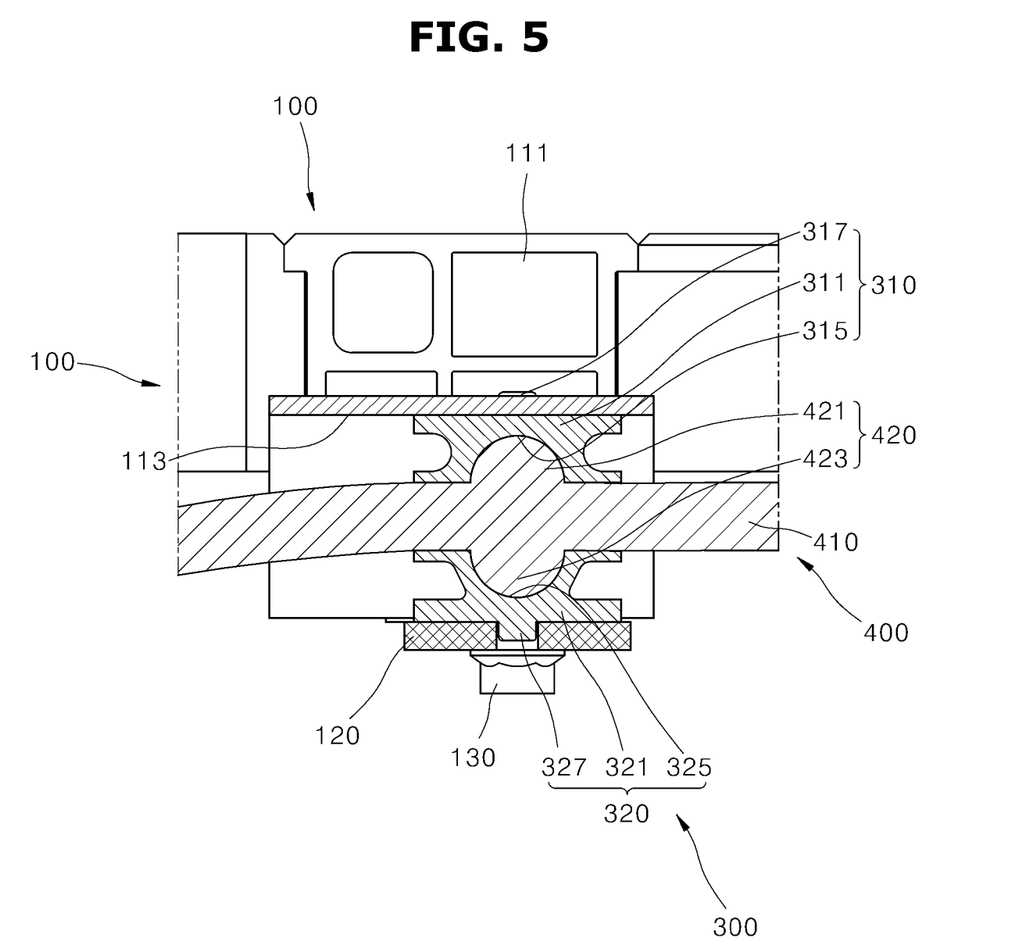
FIG. 5 is a partially enlarged view schematically illustrating A of FIG. 4.
Figure 6:
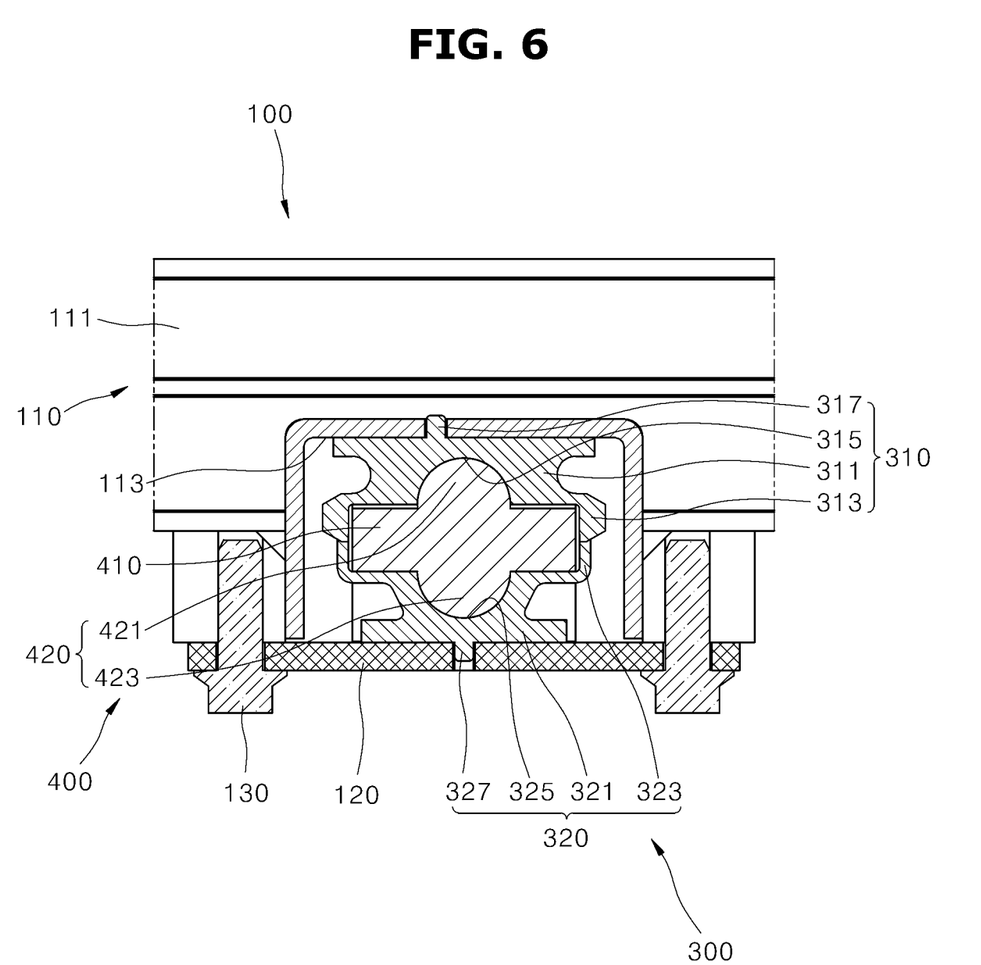
FIG. 6 is a cross-sectional view schematically illustrating B-B of FIG. 4.

FIG. 1 is a perspective view schematically illustrating a transverse leaf spring assembly according to an embodiment of the present disclosure. FIG. 2 is an assembled perspective view schematically illustrating the transverse leaf spring assembly according to an embodiment of the present disclosure. FIG. 3 is an assembled bottom perspective view schematically illustrating the transverse leaf spring assembly according to an embodiment of the present disclosure. FIG. 4 is a front view schematically illustrating a transverse leaf spring assembly according to an embodiment of the present disclosure. FIG. 5 is a partially enlarged view schematically illustrating A of FIG. 4. FIG. 6 is a cross-sectional view schematically illustrating B-B of FIG. 4.

Referring to FIG. 1 to FIG. 6, the transverse leaf spring assembly according to an embodiment of the present disclosure may include a frame 100, a lower arm 200, a bush 300, and a leaf spring 400.

The lower arms 200 may be rotatably mounted on both sides of the frame 100, respectively. The bush 300 may be mounted beneath of the frame 100 (as shown in FIG. 2).

The frame 100 may include a frame body 110, a bracket 120, and a fastener 130. The frame body 110 may accommodate the bush 300 and rotatably support the lower arm 200. The bush 300 may be mounted beneath the frame body 110 (as shown in FIGS. 2 and 3). The lower arms 200 may be rotatably mounted on both left and right sides of the frame body 110, respectively.

The frame body 110 may include a frame support body portion 111, a frame accommodation portion 113, and a frame rotation portion 115. The frame accommodation portion 113 may be formed on the lower portion of the frame support body portion 111, and the frame rotation portion 115 may be rotatably mounted on both left and right sides of the frame support body portion 111. A vehicle body (not illustrated) may be mounted on the frame body 110.

The frame accommodation portion 113 may be concavely formed on the lower portion (as shown in FIG. 3) of the frame support body portion 111, and may accommodate the first bush 310 and the second bush 320 of the bush 300.

The frame rotation portion 115 may rotatably support the lower arm 200 on the frame support body portion 111. The frame rotation portions 115 may be mounted on both left and right sides of the frame support body portion 111, respectively. The frame rotation portion 115 may be hingedly coupled to the lower arm 200 to rotatably support the lower arm 200.

The bracket 120 may close the frame body 110, which accommodates the bush 300. The bracket 120 may close the frame accommodation portion 113, which accommodates the bush 300, of the frame body 110. The bracket 120 may be made of a flat plate, and may be formed to be larger than the frame accommodation portion 113.

The fastener 130 may fasten the bracket 120 to the frame body 110. The fastener 130 may include a bolt, screw, or the like, and may fasten the bracket 120 and the frame support body portion 111 of the frame body 110. An adhesive may be applied to the fastener so that the bracket 120 and the frame support body portion 111 of the frame body 110 may remain firmly coupled to each other.

The lower arms 200 may be rotatably mounted on both sides of the frame 100, respectively. The lower arms 200 may rotate by being hingedly coupled to the frame rotation portion 115 of the frame 100. The lower arms 200 may connect the vehicle body and wheels of the vehicle.

An end bush 210 may be mounted on the lower arm 200. The end bush 210 may be in contact with an end of a leaf spring body 410 of the leaf spring 400. The end bush 210 may be made of plastic, rubber, or the like. The end bush 210 may be made of an elastically deformable material so as to alleviate damage or impact to the leaf spring 400.

The bush 300 may be mounted on the frame 100. The bush 300 may support the leaf spring 400. The bush 300 may be accommodated in the frame accommodation portion 113 of the frame 100. A pair of the bushes 300 may be arranged, along a lengthwise direction of the leaf spring 400 (the horizontal direction in FIG. 4), to be spaced apart from each other.

The bush 300 may limit movement of the leaf spring 400, thereby preventing the leaf spring 400 from being pushed to an opposite side by the curvature and rigidity of the leaf spring 400 during assembly and ensuring reliable ease of assembly.

The bush 300 may include the first bush 310 and the second bush 320. The first bush 310 may be arranged above the second bush 320 (as shown in FIG. 2).

Drawings of the present disclosure may illustrate an example of the first bush 310 as a pair of the first bushes 310, which are formed to be spaced apart from each other on the leaf spring body 410 of the leaf spring 400, and an example of the second bush 320 as a pair of the second bushes 320, which are formed to be spaced apart from each other beneath the leaf spring body 410 of the leaf spring 400.

The first bush 310 may include a first bush body 311, a first bush protrusion 313, and a first bush accommodation groove 315.

The first bush body 311 may be arranged on the leaf spring 400, and may be in contact with an upper surface of the leaf spring 400 (as shown in FIGS. 5 and 6).

The first bush protrusion 313 may protrude from the first bush body 311 to surround a lateral surface of the leaf spring 400. The first bush protrusion 313 may protrude downward from an edge of the first bush body 311 to surround the upper surface of the leaf spring 400. A pair of the first bush protrusions 313 may be formed to be spaced apart from each other, and a distance between the first bush protrusions 313 spaced apart from each other may be the same as a width of the leaf spring body 410 of the leaf spring 400.

The first bush accommodation groove 315 may be concavely formed on the first bush body 311 to accommodate a projection 420 protruding from the upper portion of the leaf spring 400. The first bush accommodation groove 315 may be formed, on the first bush body 311, to oppose a first projection 421 of the projection 420 protruding from the upper portion of the leaf spring 400. The first bush accommodation groove 315 may be formed to match the shape of the first projection 421 of the projection 420.

The first bush accommodation groove 315 may be formed to be recessed in a hemispherical shape to match the shape of the first projection 421 of the projection 420. The first bush accommodation groove 315 may accommodate the first projection 421 of the projection 420 to prevent, with the first bush protrusion 313, the leaf spring 400 from being dislodged.

The first bush 310 may further include a first bush insertion portion 317. The first bush insertion portion 317 may be protruding from the first bush body 311 and inserted into the frame 100. The first bush insertion portion 317 may be protruding from the upper portion of the first bush body 311 (as shown in FIGS. 5 and 6) and inserted into the frame body 110 of the frame 100, and thus may be limited in movement. Thus, movement of the leaf spring 400 may be limited by the first bush 310.

The second bush 320 may include a second bush body 321, a second bush protrusion 323, and a second bush accommodation groove 325.

The second bush body 321 may be arranged beneath the leaf spring 400, and may be in contact with a lower surface of the leaf spring 400 (as shown in FIGS. 5 and 6).

The second bush protrusion 323 may protrude from the second bush body 321 to surround a lateral surface of the leaf spring 400. The second bush protrusion 323 may protrude upward from an edge of the second bush body 321 to surround the lower surface of the leaf spring 400. A pair of the second bush protrusions 323 may be formed to be spaced apart from each other, and a distance between the second bush protrusions 323 spaced apart from each other may be the same as the width of the leaf spring body 410 of the leaf spring 400.

The second bush accommodation groove 325 may be concavely formed on the second bush body 321 to accommodate the projection 420 protruding from the lower portion of the leaf spring 400. The second bush accommodation groove 325 may be formed, on the second bush body 321, to oppose the second projection 423 of the projection 420 protruding from the lower portion of the leaf spring 400. The second bush accommodation groove 325 may be formed to match the shape of the second projection 423 of the projection 420.

The second bush accommodation groove 325 may be formed to be recessed in a hemispherical shape to match the shape of the second projection 423 of the projection 420. The second bush accommodation groove 325 may accommodate the second projection 423 of the projection 420 to prevent, with the second bush protrusion 323, the leaf spring 400 from being dislodged.

The second bush 320 may further include a second bush insertion portion 327. The second bush insertion portion 327 may be protruding from the second bush body 321 and inserted into the frame 100. The second bush insertion portion 327 may be protruding from the lower portion of the second bush body 321 (as shown in FIGS. 5 and 6) and inserted into the bracket 120 of the frame 100, and thus may be limited in movement. Thus, movement of the leaf spring 400 may be limited by the second bush 320.

The leaf spring 400 may have both ends thereof in contact with the lower arms 200, respectively, and include the projection 420 protruding therefrom, and may be fixed by the bush 300. The leaf spring 400 may be a transverse leaf spring formed to be transversely elongated on both left and right sides of the frame 100.

The leaf spring 400 may include the leaf spring body 410 and the projection 420. The leaf spring body 410 may have both ends thereof in contact with the lower arms 200, respectively. The projection 420 may be protruding from the surface of the leaf spring body 410. The leaf spring body 410 may be a transverse leaf spring formed to be transversely elongated on both left and right sides of the frame 100.

Both ends of the leaf spring body 410 may be seated on the end bushes 210, respectively, which are mounted on the lower arms 200.

At least one of the projections 420 may be protruding from one side (the upper side in FIG. 4) and the other side (the lower side in FIG. 4) of the leaf spring body 410. Drawings of the present disclosure may illustrate an example of the projections 420 as a pair of the projections 420, which are formed to be spaced apart from each other on the leaf spring body 410 and as a pair of the projections 420, which are formed to be spaced apart from each other beneath the leaf spring body 410.

The projection 420 may include the first projection 421 and the second projection 423. The first projection 421 may be protruding from the upper portion of the leaf spring body 410 (as shown in FIG. 4) and inserted into the first bush 310, and thus may be limited in dislodgement from the first bush 310. The first projection 421 may be formed to match the shape of the first bush accommodation groove 315 of the first bush 310. The first projection 421 may be protruding in a hemispherical shape to match the shape of the first bush accommodation groove 315.

The second projection 423 may be protruding from the lower portion of the leaf spring body 410 (as shown in FIG. 4), and inserted into the second bush 320, and thus may be limited in dislodgement from the second bush 320. The second projection 423 may be formed to match the shape of the second bush accommodation groove 325 of the second bush 320. The second projection 423 may be protruding in a hemispherical shape to match the shape of the second bush accommodation groove 325.

The first projection 421 and the second projection 423 may be inserted into the first bush accommodation groove 315 of the first bush 310 and the second bush accommodation groove 325 of the second bush 320, respectively, to prevent the leaf spring 400 from being pushed to an opposite side during assembly of the leaf spring 400.

The leaf spring 400 may be made of glass fiber reinforced plastic (GFRP). Glass fiber reinforced plastic, which is a polyester resin mixed with glass fibers and cured, has high heat-resistance and mechanical and a lighter weight than steel, thereby improving the fuel efficiency of the vehicle.

The transverse leaf spring assembly according to the present disclosure may enable a center of the vehicle in the width direction of the vehicle and a center of the transverse leaf spring to align when the transverse leaf spring is assembled.

In addition, the transverse leaf spring assembly according to the present disclosure may prevent the leaf spring from being pushed to an opposite side by the curvature and rigidity of the transverse leaf spring during assembly and ensure stable ease of assembly as the projection of the leaf spring is inserted into the bush.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A transverse leaf spring assembly for a suspension of a vehicle, the assembly comprising:
 a frame;
 lower arms rotatably mounted on two sides of the frame, respectively;
 a bush mounted on the frame, wherein the bush comprises:
 a first bush mounted on the frame and configured to be in contact with an upper surface of a leaf spring; and
 a second bush arranged beneath the first bush and configured to be in contact with a lower surface of the leaf spring; and
 the leaf spring having two ends in contact with the lower arms, respectively, the leaf spring comprising a projection protruding from the leaf spring, and being fixed by the bush,
 wherein:
 the first bush includes a first bush accommodation groove concavely disposed on a first bush body of the first bush and configured to accommodate the projection protruding from a upper portion of the leaf spring, and
 the second bush includes a second bush accommodation groove concavely disposed on a second bush body of the second bush and configured to accommodate the projection protruding from a lower portion of the leaf spring,
 the projection comprises:
 a first projection protrudes from an upper portion of a leaf spring body of the leaf spring and fits directly with the first bush accommodation groove; and
 a second projection protrudes from the lower portion of the leaf spring body and fits directly with the second bush accommodation groove.

2. The assembly of claim 1, wherein:
 the projection is inserted into at least one of the first bush and the second bush.

3. The assembly of claim 2, wherein the first bush comprises:
 the first bush body configured to be in contact with the upper surface of the leaf spring;
 a first bush protrusion protruding from the first bush body to surround a lateral surface of the leaf spring.

4. The assembly of claim 3, wherein the first bush further comprises a first bush insertion portion protruding from the first bush body and inserted into the frame.

5. The assembly of claim 2, wherein the second bush comprises:
 the second bush body configured to be in contact with the lower surface of the leaf spring;
 a second bush protrusion protruding from the second bush body to surround a lateral surface of the leaf spring.

6. The assembly of claim 5, wherein the second bush further comprises a second bush insertion portion protruding from the second bush body and inserted into the frame.

7. The assembly of claim 2, wherein:
 the leaf spring body includes the projection protruding from a surface of the leaf spring body.

8. The assembly of claim 7, wherein the projection has a hemispherical shape.

9. The assembly of claim 1, wherein the frame comprises:
 a frame body accommodating the bush and rotatably supporting the lower arms;
 a bracket closing the frame body accommodating the bush; and
 a fastener fastening the bracket to the frame body.

10. The assembly of claim 9, wherein the frame body comprises:
 a frame support body portion;
 a frame accommodation portion concavely disposed on the frame support body portion and configured to accommodate the bush; and
 a frame rotation portion rotatably supporting one of the lower arms on the frame support body portion.

11. The assembly of claim 1, wherein the leaf spring is made of glass fiber reinforced plastic (GFRP).

* * * * *